(12) United States Patent
Tong

(10) Patent No.: US 8,354,589 B2
(45) Date of Patent: Jan. 15, 2013

(54) POWER CABLE

(75) Inventor: Song-Lin Tong, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 358 days.

(21) Appl. No.: 12/777,263

(22) Filed: May 11, 2010

(65) Prior Publication Data

US 2011/0235245 A1 Sep. 29, 2011

(30) Foreign Application Priority Data

Mar. 23, 2010 (CN) .......................... 2010 1 0130468

(51) Int. Cl.
*H01R 4/00* (2006.01)
(52) U.S. Cl. ..................... 174/84 R; 174/84 S
(58) Field of Classification Search ................ 174/74 R, 174/84 R, 78, 36
See application file for complete search history.

(56) References Cited

U.S. PATENT DOCUMENTS

| | | | | |
|---|---|---|---|---|
| 6,774,603 B2 * | 8/2004 | Liao | ............................. | 320/107 |
| 6,825,427 B2 * | 11/2004 | Jenks | ......................... | 200/51.12 |
| 7,910,834 B2 * | 3/2011 | McGinley et al. | ............ | 174/112 |
| 7,960,648 B2 * | 6/2011 | McGinley et al. | ............... | 174/36 |
| 2009/0295327 A1 * | 12/2009 | McGinley et al. | ............ | 320/111 |

* cited by examiner

*Primary Examiner* — William Mayo, III
(74) *Attorney, Agent, or Firm* — Altis Law Group, Inc.

(57) ABSTRACT

A power cable is configured for connecting at least one electrical device to a power source. The power cable includes an input terminal, at least one output terminal, a power transmitting wire, a switch, a voltage setting device, a voltage sampling device, a voltage comparing device and a power supply. The power transmitting wire connects the input terminal and the output terminal via the switch. The voltage sampling device is configured for sensing a voltage of the output terminal. The voltage comparing device is configured for comparing a preset voltage stored in the voltage setting device and the sampled voltage sensed by the voltage sampling device to turn on or turn off the switch according to the compared result. The power supply is configured for reducing the voltage of the power source to the rated voltage of the voltage comparing device to power the voltage comparing device.

14 Claims, 2 Drawing Sheets

POWER CABLE

BACKGROUND

1. Technical Field

The present disclosure relates to cables and, particularly, to a power cable capable of supplying multiple voltage levels.

2. Description of Related Art

Output voltages of current available household power supplies generally may be 110V or 220V. Rated voltages of current electrical devices also include 110V or 220V. As such, an electrical device may be connected to a mismatched power supply. When the electrical device is connected to a mismatched power supply, it is at risk of being damaged.

Therefore, it is desirable to provide a power cable, which can overcome the above-mentioned limitations.

BRIEF DESCRIPTION OF THE DRAWINGS

Many aspects of the disclosures should be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Figure 1:
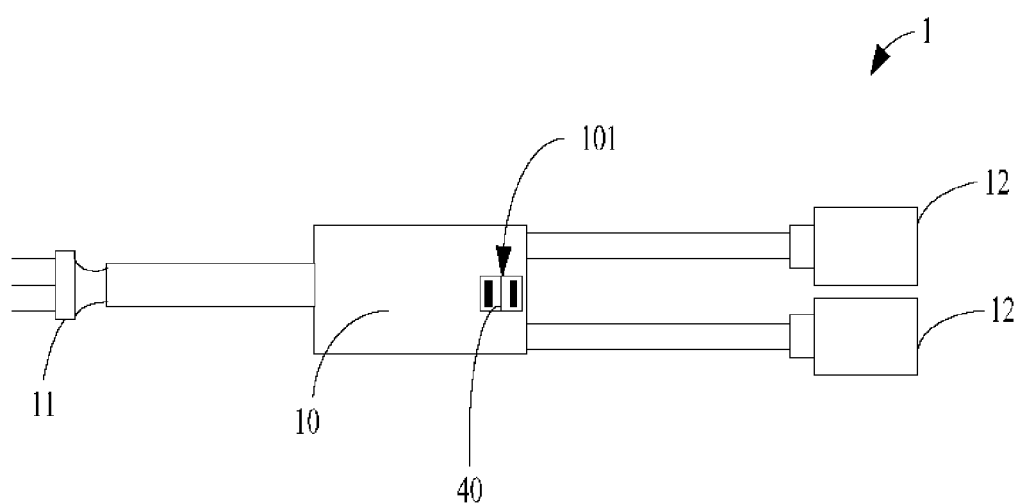
FIG. 1 is a schematic view of a power cable, according to an exemplary embodiment.
Figure 2:
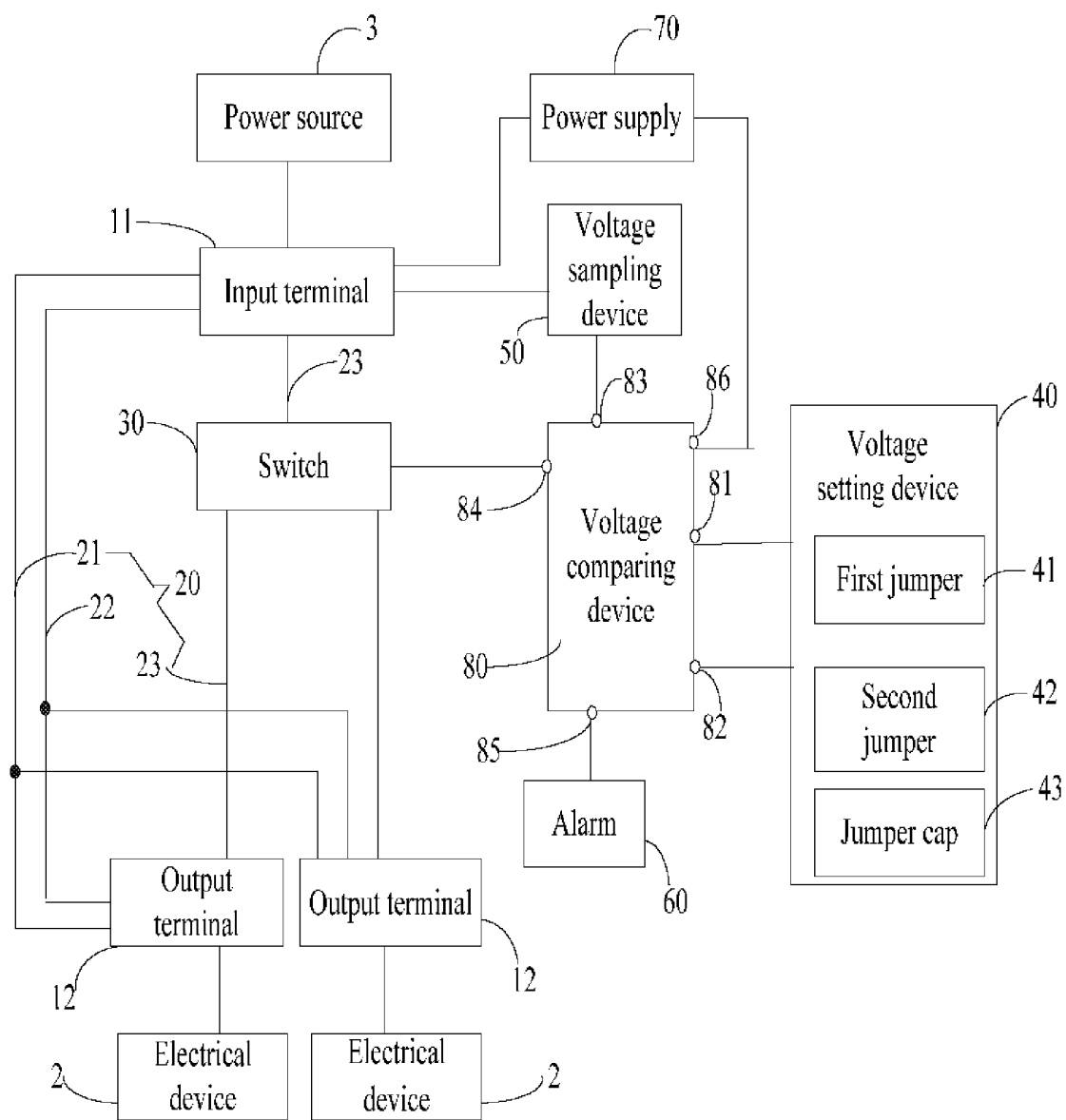
FIG. 2 is a block diagram of the power cable of FIG. 1.

Referring to FIG. 1 and FIG. 2, a power cable 1 configured for simultaneously connecting a plurality of electrical devices 2 to a power source 3 includes a housing 10, an input terminal 11, a plurality of output terminals 12 (two are illustrated in the embodiment), a power transmitting wire 20, and a switch 30, a voltage setting device 40, a voltage sampling device 50, an alarm 60, a power supply 70, and a voltage comparing device 80. The power transmitting wire 20, the switch 30, the voltage setting device 40, the voltage sampling device 50, the alarm 60, the power supply 70, and the voltage comparing device 80 are received in the housing 10. The housing 10 defines a hole 101 and the voltage setting device 40 extends from the hole.

The input terminal 11 is electrically connected to the power source 3. The output voltage of the power source 3 may be 110V or 220V. In the embodiment, the output voltage of the power source 3 is 220V.

Each of the two output terminals 12 is connected to a corresponding electrical device 2. In the embodiment, the two electrical devices 2 are a computer host and a display.

The power transmitting wire 20 includes a neutral wire 21, an ground wire 22, and a live wire 23. The neutral wire 21 and the ground wire 22 make a parallel connection between the input terminal 11 and the output terminals 12. The live wire 23 connects the input terminal 11 to the output terminals 12 through the switch 30. In the embodiment, the switch 30 is a relay.

The voltage setting device 40 includes a first jumper 41, a second jumper 42, and a jumper cap 43. The first jumper 41 and the second jumper 42 each have a first electrical terminal and a second electrical terminal. The first electrical terminals of the first jumper 41 and the second jumper 42 are grounded. The second electrical terminals of the first jumper 41 and the second jumper 42 are connected to a corresponding first pin 81 and second pin 82 of the voltage comparing device 80 respectively. The first jumper 41 and the second jumper 42 each have two conductive sheets. The jumper cap 43 is configured for selectively and electrically bridging the two conductive sheets of the first jumper 41 or the two conductive sheets of the second jumper 42. The voltage setting device 40 is configured to set a preset voltage and transmit the preset voltage to the voltage comparing device 80. The preset voltage is compared with the output voltage of the power source 3 by the voltage comparing device 80 (seen below). If the rated voltage of the electrical devices 2 is about 110V, the two conductive sheets of the first jumper 41 are bridged to provide a low electric level signal to the first pin 81. If the rated voltage of the electrical devices 2 is about 220V, the two conductive sheets of the second jumper 42 are bridged to provide a low electric level signal to the second pin 82.

The voltage sampling device 50 is electrically connected to the input terminal 11 to sample the output voltage of the power source 3 and output the sampled voltage to a third pin 83 of the voltage comparing device 80. When the output voltage of the power source 3 is 110V, the voltage sampling device 50 will provide a low electric level to the third pin 83. When the output voltage of the power source 3 is 220V, the voltage sampling device 50 will provide a high electric level to the third pin 83.

The alarm 60 is electrically connected to a fifth pin 85 of the voltage comparing device 80 and configured for sending an alarm according to a control signal from the fifth pin 85. In the embodiment, the alarm 60 may be but not limited to a buzzer or a light emitting diode (LED).

The power supply 70 is electrically connected between the input terminal 11 and a sixth pin 86 of the voltage comparing device 80 and configured for converting the output voltage of the power source 3 to a rated voltage of the voltage comparing device 80 so as to appropriately supply power to the voltage comparing device 80.

The voltage comparing device 80 also includes a fourth pin 84 connected to the switch 30. A chart is stored in the voltage comparing device 80. The chart shows that the low electric level of the third pin 83 is matched with the low electric level of the first pin 81 and the high electric level of the third pin 83 is matched with the low electric level of the second pin 82. When the voltage comparing device 80 is powered by the power supply 70 via the sixth pin 86, the voltage comparing device 80 compares the electric level of the first pin 81 or the second pin 82 and the electric level of the third pin 83. Moreover, it turns on the switch 30 when the electric level of the first pin 81 or the second pin 82 matches that of the third pin 83. Otherwise, the voltage comparing device 80 turns off the switch 30 and triggers the alarm 60 to send an alarm via the fifth pin 85 in case the electric level of the first pin 81 or the second pin 82 are not matched with that of the third pin 83. In the embodiment, the voltage comparing device 80 is a single chip micyoco (SCM).

In use, the input terminal 11 is connected to the power source 3, and the comparing device 80 is powered by the power supply 70. The voltage sampling device 50 will provide a high electric level to the third pin 83. When the rated voltage of the electrical devices 2 is about 110V, the two conductive sheets of the first jumper 41 are bridged to provide a low electric level signal to the first pin 81. The voltage comparing device 80 compares the electric level of the first pins 81 and the third pin 83 according the chart to control the switch 30 to turn off and triggers the alarm 60 to send an alarm via the fifth pin 85. When the rated voltage of the electrical devices 2 is about 220V, the two conductive sheets of the second jumper 42 are bridged to provide a low electric level signal to the second pin 82. The voltage comparing device 80 compares the electric level of the second pin 82 and the third pin 83 according the chart to control the switch 30 to turn on.

It will be understood that the above particular disclosures and methods are shown and described by way of illustration only. The principles and the features of the present disclosure may be employed in various and numerous disclosures thereof without departing from the scope of the disclosure as claimed. The above-described disclosures illustrate the scope of the disclosure but do not restrict the scope of the disclosure.

What is claimed is:

1. A power cable comprising:
   an input terminal configured for connecting to a power source, at least one output terminal configured for connecting to at least one electrical device, a switch connected between the input terminal and the at least one output terminal via a power transmitting wire,
   a voltage comparing device connected to the switch,
   a voltage setting device connected to the voltage comparing device, the voltage setting device comprising:
      a first jumper comprising two conductive sheets,
      a second jumper comprising another two conductive sheets, and
      a jumper cap configured for selectively and electrically bridging the two conductive sheets of the first jumper or the two conductive sheets of the second jumper,
   a voltage sampling device connected between the input terminal and the voltage comparing device and configured for sampling a voltage of the power source, the voltage comparing device configured for comparing a preset voltage stored in the voltage setting device and the sampled voltage sensed by the voltage sampling device, to turn on or turn off the switch according to the compared result between the preset voltage and the sampled voltage, and
   a power supply connected with the input terminal and the voltage comparing device and configured for reducing the voltage of the power source to a rated voltage for the voltage comparing device to power the voltage comparing device.

2. The power cable in claim 1, wherein the power transmitting wire comprises a neutral wire, an ground wire and a live wire, the neutral wire and the ground wire make a parallel connection between the input terminal and the output terminals respectively, the live wire is connected between the input terminal and the output terminals via the switch.

3. The power cable in claim 1, wherein the switch is a relay.

4. The power cable in claim 1, wherein the first jumper and the second jumper each have a first electrical terminal and a second electrical terminal, the first electrical terminals of the first jumper and the second jumper are grounded, the second electrical terminals of the first jumper and the second jumper are connected to a corresponding first pin and a second pin of the voltage comparing device, respectively.

5. The power cable in claim 4, wherein the voltage comparing device comprises a third pin, when the output voltage of the power source is 110V, the voltage sampling device will provide a low electric level to the third pin, when the output voltage of the power source is 220V, the voltage sampling device will provide a high electric level to the third pin.

6. The power cable in claim 5, wherein a chart is stored in the voltage comparing device, the voltage comparing device compares the electric level of the first pin or the second pin and the electric level of the third pin according the chart.

7. The power cable in claim 6, wherein the chart shows that the low electric level of the third pin is matched with the low electric level of the first pin, the high electric level of the third pin is matched with the low electric level of the second pin.

8. The power cable in claim 7, wherein the voltage comparing device is a single chip micyoco.

9. The power cable in claim 1, wherein the power cable further comprises an alarm, the alarm is connected with the voltage comparing device and configured for sending an alarm according a control signal of the voltage comparing device.

10. The power cable in claim 9, wherein the alarm is a buzzer.

11. The power cable in claim 9 wherein the alarm is a light emitting diode.

12. The power cable in claim 1, wherein the power cable further comprises a housing, the power transmitting wire, the switch, the voltage setting device, the voltage sampling device, the alarm, the power supply, and the voltage comparing device are received in the housing, the housing defines a hole and the switch extends from the hole.

13. The power cable in claim 1, wherein the output voltage of the power source is 110V or 220V.

14. The power cable in claim 1, wherein the rated voltage of the at least one electrical device is 110V or 220V.

* * * * *